US011086906B2

(12) United States Patent
Burchard et al.

(10) Patent No.: US 11,086,906 B2
(45) Date of Patent: Aug. 10, 2021

(54) SYSTEM AND METHOD FOR RECONCILIATION OF DATA IN MULTIPLE SYSTEMS USING PERMUTATION MATCHING

(71) Applicant: Goldman Sachs & Co. LLC, New York, NY (US)

(72) Inventors: Paul Burchard, Jersey City, NJ (US); Vladimir M. Zakharov, Bronx, NY (US)

(73) Assignee: Goldman Sachs & Co. LLC, New York, NY (US)

( * ) Notice: Subject to any disclaimer, the term of this patent is extended or adjusted under 35 U.S.C. 154(b) by 358 days.

(21) Appl. No.: 15/938,084

(22) Filed: Mar. 28, 2018

(65) Prior Publication Data

US 2018/0300390 A1    Oct. 18, 2018

Related U.S. Application Data

(60) Provisional application No. 62/485,264, filed on Apr. 13, 2017.

(51) Int. Cl.
*G06F 16/00* (2019.01)
*G06F 16/28* (2019.01)
*G06F 16/245* (2019.01)

(52) U.S. Cl.
CPC .......... *G06F 16/285* (2019.01); *G06F 16/245* (2019.01)

(58) Field of Classification Search
CPC ................ G06F 16/285; G06F 16/245
See application file for complete search history.

(56) References Cited

U.S. PATENT DOCUMENTS

| | | | |
|---|---|---|---|
| 7,403,917 B1 | 7/2008 | Larsen | |
| 2001/0047279 A1* | 11/2001 | Gargone | G06Q 10/067 705/342 |
| 2005/0187852 A1 | 8/2005 | Hwang | |
| 2007/0180194 A1* | 8/2007 | Graham | G06F 11/1658 711/133 |
| 2015/0242456 A1* | 8/2015 | Cannon | G06Q 10/101 707/608 |
| 2017/0230173 A1* | 8/2017 | Choi | H04L 9/0852 |
| 2017/0371936 A1* | 12/2017 | Yu | G06F 16/248 |

* cited by examiner

*Primary Examiner* — Usmaan Saeed
*Assistant Examiner* — William P Bartlett

(57) ABSTRACT

A method includes obtaining first and second data sets to be reconciled and, using matching rules, identifying discrepancies between the data sets. The matching rules include at least one permutation key, where each permutation key identifies a subset of data to be grouped together in one of the data sets. Identifying the discrepancies includes attempting to match one or more first characteristics associated with the grouped subset of data in one of the data sets to one or more second characteristics associated with another of the data sets. The matching rules could involve multiple matching characteristics, and the matching rules could be generated using a metric to select the matching characteristics of the matching rules. The metric could be based on a combination of a number of matched data items and a number of matched groups of data items.

18 Claims, 5 Drawing Sheets

| ID | SPECIES | TIME | QUANTITY | BREAK |
|---|---|---|---|---|
| 1 | A. CEPHALOTES | 1:03 | 10 | |
| 2 | A. CEPHALOTES | 1:03 | 15 | |
| 3 | A. CEPHALOTES | 2:41 | 5 | |
| 4 | A. CEPHALOTES | 3:24 | 35 | ///  |
| 5 | O. SMARAGDINA | 1:03 | 25 | |
| 6 | O. SMARAGDINA | 1:20 | 100 | |
| 7 | O. SMARAGDINA | 2:41 | 10 | /// |
| 8 | O. SMARAGDINA | 3:24 | 20 | |
| 9 | O. SMARAGDINA | 3:24 | 40 | |

FIG. 3A

| ID | SPECIES | QUANTITY | BREAK |
|---|---|---|---|
| 11 | A. CEPHALOTES | 25 | |
| 12 | A. CEPHALOTES | 5 | |
| 13 | O. SMARAGDINA | 25 | |
| 14 | O. SMARAGDINA | 100 | |
| 15 | O. SMARAGDINA | 60 | |
| 16 | O. SMARAGDINA | 15 | /// |

SYSTEM AND METHOD FOR RECONCILIATION OF DATA IN MULTIPLE SYSTEMS USING PERMUTATION MATCHING

CROSS-REFERENCE TO RELATED APPLICATION AND PRIORITY CLAIM

This application claims priority under 35 U.S.C. § 119(e) to U.S. Provisional Patent Application No. 62/485,264 filed on Apr. 13, 2017, which is hereby incorporated by reference in its entirety.

TECHNICAL FIELD

This disclosure relates generally to computing systems. More specifically, this disclosure relates to a system and method for reconciliation of data in multiple systems using permutation matching.

BACKGROUND

A common task in managing data stored electronically involves reconciling data between different systems, such as between external and internal systems or between different internal systems. This task is often difficult because different systems routinely have different taxonomies and different models of the data, including different levels of granularity. This can make it difficult or impossible to quickly locate discrepancies in the data between the systems.

SUMMARY

This disclosure provides a system and method for reconciliation of data in multiple systems using permutation matching.

In a first embodiment, a method includes obtaining first and second data sets to be reconciled and, using matching rules, identifying discrepancies between the data sets. The matching rules include at least one permutation key, where each permutation key identifies a subset of data to be grouped together in one of the data sets. Identifying the discrepancies includes attempting to match one or more first characteristics associated with the grouped subset of data in one of the data sets to one or more second characteristics associated with another of the data sets.

In a second embodiment, an apparatus includes at least one memory configured to store first and second data sets and at least one processing device configured to identify discrepancies between the data sets using matching rules. The matching rules include at least one permutation key, where each permutation key identifies a subset of data to be grouped together in one of the data sets. To identify the discrepancies, the at least one processing device is configured to attempt to match one or more first characteristics associated with the grouped subset of data in one of the data sets to one or more second characteristics associated with another of the data sets.

In a third embodiment, a non-transitory computer readable medium contains instructions that when executed cause at least one processor to obtain first and second data sets to be reconciled and, using matching rules, identify discrepancies between the data sets. The matching rules include at least one permutation key, where each permutation key identifies a subset of data to be grouped together in one of the data sets. The instructions that when executed cause the at least one processor to identify the discrepancies include instructions that when executed cause the at least one processor to attempt to match one or more first characteristics associated with the grouped subset of data in one of the data sets to one or more second characteristics associated with another of the data sets.

Other technical features may be readily apparent to one skilled in the art from the following figures, descriptions, and claims.

BRIEF DESCRIPTION OF THE DRAWINGS

For a more complete understanding of this disclosure and its features, reference is now made to the following description, taken in conjunction with the accompanying drawings, in which:

FIGS. 3A and 3B illustrate an example result of reconciling data using permutation matching according to this disclosure;

DETAILED DESCRIPTION

Figure 1:
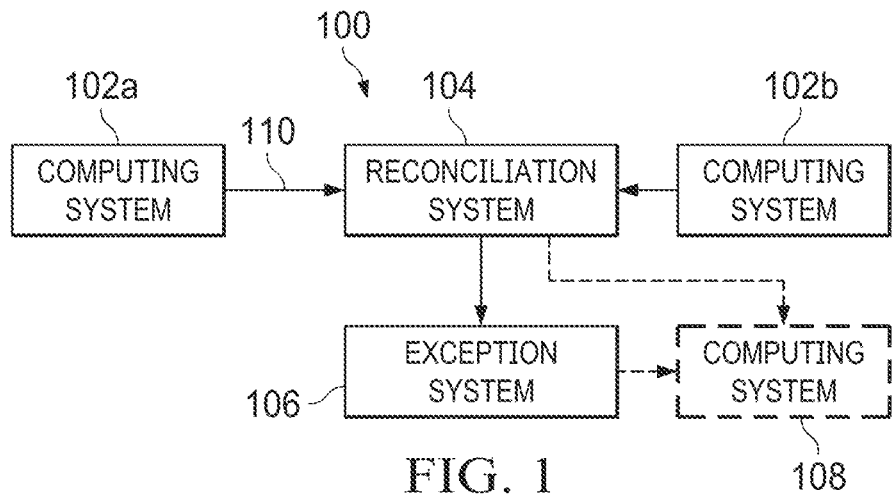
FIG. 1 illustrates an example system supporting reconciliation of data using permutation matching according to this disclosure.

FIGS. 1 through 7, discussed below, and the various embodiments used to describe the principles of the present invention in this patent document are by way of illustration only and should not be construed in any way to limit the scope of the invention. Those skilled in the art will understand that the principles of the invention may be implemented in any type of suitably arranged device or system.

As noted above, a common task in managing data stored electronically involves reconciling data between different systems. This may be necessary or desirable for various reasons, such as to check data consistency across multiple systems or to provide combined access to the data of multiple systems. Unfortunately, this task is often difficult because different systems routinely have different taxonomies and different models of the data, including different levels of granularity. In other words, different systems could store the exact same data in different formats or different arrangements, such as when the data in one system is subdivided or combined in another system. As a result, it can be extremely difficult to identify the same data stored in multiple systems, to say nothing about the difficulty of locating missing or inconsistent data between the systems. This can make it difficult or impossible to quickly locate discrepancies in the data between the systems to support data reconciliation.

In accordance with this disclosure, techniques are provided to support reconciliation of data using permutation matching. More specifically, these techniques analyze data to be reconciled in order to generate matching rules. The matching rules identify how different data in different systems are related, which allows these techniques to determine how to compare the data in the different systems. The matching rules can then be used to identify actual data discrepancies (such as missing or inconsistent data) between the systems.

At least one of the matching rules can be generated using permutation matching, which generally involves identifying one or more suitable permutation "keys." Each permutation key identifies how to group data in at least one of the systems, where that grouping may or may not be used to group data in the other system(s). Among other things, each permutation key allows identification of how data in at least one system can be grouped in order to compare that grouped data to the data in at least one other system. Any suitable number of permutation keys could be used for each system. In some cases, no permutation keys may be needed for a specific system if the data in that specific system is not being grouped to support data reconciliation.

In this way, these techniques support more efficient data reconciliation by automatically identifying how data in different systems might be related. Those relationships between the data can be used to generate matching rules, which are then used to identify missing or inconsistent data in one or more of the systems. These approaches can therefore significantly speed up and improve the effectiveness of the reconciliation of data in multiple systems, which can be advantageous for various reasons.

In some cases, the ability to more quickly or effectively reconcile data in multiple systems can be used to validate that data, such as when making a determination whether certain data in different systems may likely be valid or not valid based on the data in those systems being consistent or inconsistent. In other cases, the ability to more quickly or effectively reconcile data in multiple systems can be used during a data "migration," such as when making a determination whether large amounts of data were successfully transferred between systems. In still other cases, the ability to more quickly or effectively reconcile data in multiple systems can be used to identify defective or other problematic components, such as when making a determination whether data collected by different devices can be matched. If not, this may be indicative that at least one of the devices could be suffering from a problem. Note that these are merely examples and that any number of other functions or operations could occur more quickly or more effectively using the data reconciliation approaches described in this patent document.

FIG. 1 illustrates an example system 100 supporting reconciliation of data using permutation matching according to this disclosure. As shown in FIG. 1, the system 100 includes at least two computing systems 102a-102b, a reconciliation system 104, and an exception system 106.

The computing systems 102a-102b generally denote computing or database systems that store data to be reconciled. The computing systems 102a-102b could denote any suitable systems that store data. For example, the computing systems 102a-102b could denote systems used inside the same organization, such as different computing systems used in different departments of a company or in different geographical areas. The computing systems 102a-102b could also denote systems both inside and outside of an organization, such as computing systems used by different organizations. The computing systems 102a-102b could even represent different parts of the same larger system. The computing systems 102a-102b could be used to perform any suitable functions and to store any desired data.

The reconciliation system 104 receives data from the computing systems 102a-102b and reconciles the data to identify any discrepancies between the data. For example, the reconciliation system 104 could access databases or other storage devices within the computing systems 102a-102b, or the computing systems 102a-102b could provide data to the reconciliation system 104. As described in more detail below, the reconciliation system 104 analyzes the received data to generate different matching rules, and the reconciliation system 104 uses the matching rules in order to identify discrepancies in the data. The discrepancies identify data that does not match in the computing systems 102a-102b, which could include data in the computing systems 102a-102b having different values or data in one computing system 102a-102b that lacks matching data in another computing system 102a-102b. Part of the analysis includes using permutation matching, which is described below.

The reconciliation system 104 includes any suitable structure(s) for reconciling data. The reconciliation system 104 could, for example, include one or more computing devices that execute software instructions for reconciling data. In some embodiments, the reconciliation system 104 could offer data reconciliation as a service, in which case the reconciliation system 104 could include or operate in conjunction with various components (such as one or more web or application servers) to facilitate interactions over the Internet or other network(s).

The reconciliation system 104 can generate outputs that identify data discrepancies between the computing systems 102a-102b. These outputs could be provided to any suitable destination(s), such as to the exception system 106, which can use these outputs of the reconciliation system 104 in any suitable manner. For example, the exception system 106 could use these outputs of the reconciliation system 104 to identify the data values in each of the computing systems 102a-102b that do not match. This information could be provided to one or more users for analysis and possible updating of the values in one or both of the computing systems 102a-102b. The exception system 106 could also use the information to correct the discrepancies, such as by accessing other data sources (such as public sources), determining which non-matching data values in the computing systems 102a-102b appear to be correct, and updating the incorrect data values. The exception system 106 could perform any other or additional actions depending on its implementation. Also or alternatively, outputs from the reconciliation system 104 or the exception system 106 could be provided to one or more of the computing systems 102a-102b or to at least one additional computing system 108 for performance of these functions. The exception system 106 includes any suitable structure(s) for handling outputs that identify discrepancies between data. The exception system 106 could, for example, include one or more computing devices that execute software instructions for handling data discrepancies.

The reconciliation system 104 can also generate outputs that identify consistent data between the computing systems 102a-102b. These outputs could be provided to any suitable destination(s), such as to either of the computing systems 102a-102b or to the additional computing system 108, which can use these outputs of the reconciliation system 104 in any suitable manner. For example, either of the computing systems 102a-102b or the additional computing system 108 could be configured to perform one or more actions using or based on data that is consistent between the systems 102a-

102*b*. Those actions could be taken with or without reference to any data that might be inconsistent between the systems 102*a*-102*b*.

Note that while various functions that use consistent or inconsistent data between the computing systems 102*a*-102*b* as identified by the reconciliation system 104 are described above, these functions are for illustration only. In general, any suitable function or functions could occur in a given system based on consistent or inconsistent data between the computing systems 102*a*-102*b* as identified by the reconciliation system 104.

In this example, the computing systems 102*a*-102*b*, the reconciliation system 104, the exception system 106, and the additional computing system 108 are shown as being coupled by various communication links 110. The communication links 110 include any suitable physical or wireless connections supporting the transport of data. The communication links 110 could, for example, include connections to one or more local area networks, metropolitan area networks, wide area networks, or a global communication network such as the Internet. However, the reconciliation system 104 could also be coupled directly to the computing systems 102*a*-102*b*, the exception system 106, or the additional computing system 108 without any intervening network.

Note that each of the computing systems 102*a*-102*b* and 110, the reconciliation system 104, and the exception system 106 could be implemented in any suitable manner and at any suitable location(s). For example, the reconciliation system 104 and/or the exception system 106 could be implemented within an organization that owns or operates at least one of the computing systems 102*a*-102*b*. The reconciliation system 104 and/or the exception system 106 could also be implemented remotely from the computing systems 102*a*-102*b*, such as when the reconciliation system 104 and/or the exception system 106 is implemented using one or more remote servers, a cloud computing environment, or any other computing system or environment that is communicatively coupled to the system 100.

Also note that the reconciliation system 104 and the exception system 106 could be deployed as a single process or as multiple separate processes. If the reconciliation and exception processes are implemented separately, a service protocol (such as REST or SOAP) could be used to support communications between the processes. However, this disclosure is not limited to the performance of various functions as a service, and any other suitable implementation of the reconciliation system 104 and the exception system 106 could be used.

Although FIG. 1 illustrates one example of a system 100 supporting reconciliation of data using permutation matching, various changes may be made to FIG. 1. For example, the system 100 could include any suitable number of computing systems, reconciliation systems, and exception systems that are placed in any suitable arrangement.

Figure 2:
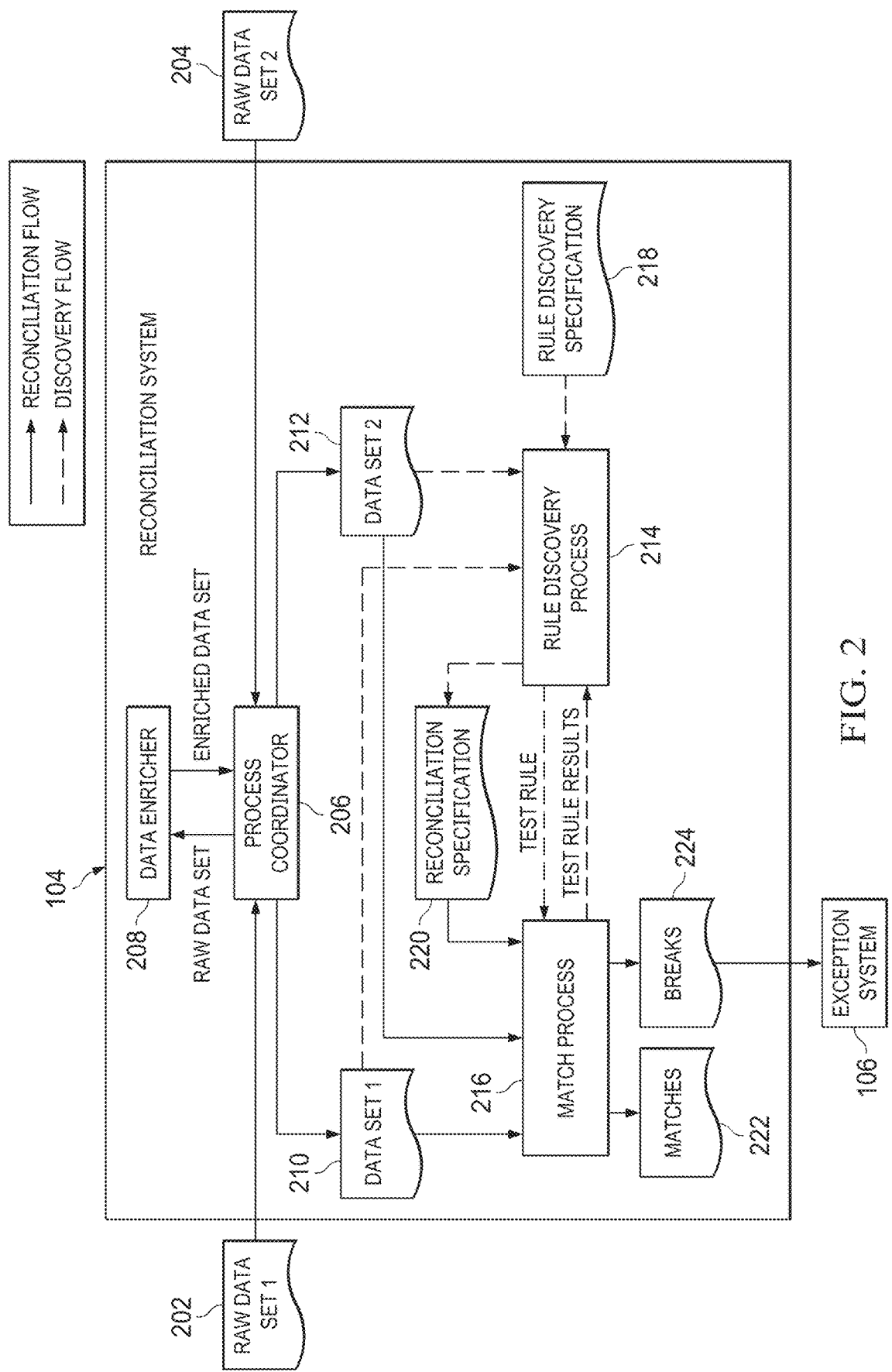
FIG. 2 illustrates an example reconciliation system for reconciling data using permutation matching according to this disclosure.

FIG. 2 illustrates an example reconciliation system 104 for reconciling data using permutation matching according to this disclosure. For ease of explanation, the reconciliation system 104 of FIG. 2 is described as being implemented in the system 100 of FIG. 1. However, the reconciliation system 104 could be used in any other suitable system to reconcile any suitable data.

The reconciliation system 104 generally operates to receive at least two raw data sets 202 and 204 and identify the differences or discrepancies between the raw data sets 202 and 204. The raw data sets 202 and 204 could denote any suitable data to be compared and could come from any suitable source(s), such as the computing systems 102*a*-102*b* in FIG. 1. The raw data sets 202 and 204 could also be received in any suitable form(s), such as in data tables.

As shown in FIG. 2, the reconciliation system 104 includes a process coordinator 206 and a data enricher 208. The process coordinator 206 generally operates to receive the raw data sets to be compared. For example, the process coordinator 206 could denote a service that accepts clients' requests for data reconciliation and arranges for the import of the raw data sets to be reconciled. Of course, the process coordinator 206 could obtain the data sets to be reconciled in any other suitable manner. The process coordinator 206 also manages interactions with other components in the reconciliation system 104 to carry out the reconciliation process. The process coordinator 206 includes any suitable logic for receiving and directing data to be reconciled.

The data enricher 208 generally operates to receive at least one data set, such as in a tabular format, and enrich one or more of the at least one data set with one or more engineered features. For example, the data enricher 208 can process the raw data sets 202 and 204 and generate enriched data sets 210 and 212, respectively. Sometimes it is helpful to derive additional values based on the data already present in a data set. The additional values are referred to as "features" and in some instances could be represented as one or more data columns in the case of a tabular data set. For instance, the data enricher 208 could generate the additional feature values and either (i) insert one or more new columns containing the feature values into the tabular data set or (ii) replace existing data in the tabular data set with one or more columns containing the feature values. These features can then be used to form keys or values (discussed below) in addition to or instead of the data available in the original raw data set. Using feature engineering can improve match quality and help find matches that would not be possible without them.

As an example, assume two tables store stock trade data and are being reconciled. One table may use a signed quantity (positive or negative) to identify buy or sell trades, respectively. The other table may store an absolute value in a quantity column and use a "buy/sell code" in another column to indicate the trade direction. For reconciliation, a feature can be added to the second data set that stores a signed quantity for each trade. The signed quantities in the two tables could then be reconciled.

As another example, assume two data sets represent people. A column in one data set contains Social Security numbers concatenated with a time stamp of when the data was entered into a system (such "111-22-3333-2017-01-01 13:59:59"). A column in another data set stores Social Security numbers by themselves. While a Social Security number would form a good key for reconciliation, it is not useable in its raw form in the first data set. Creating a new feature that represents the first 11 characters of the column in the first data set would solve this problem.

The data enricher 208 includes any suitable logic for inserting feature values into one or more data sets in order to enrich the one or more data sets. The feature values could be generated automatically or based on user input. For example, the data enricher 208 could identify related data in different data sets and generate the feature values automatically, such as by recognizing that data values in the data sets have different formats or that data values in one data set are included within larger data values in another data set. As another example, the data enricher 208 could use user input to identify the related data in different data sets and then generate the feature values based on the related data identified by the user input.

It should be noted that at least one of the enriched data sets 210 and 212 may match at least one of the raw data sets 202 and 204. For example, the data enricher 208 may add one or more data columns to only one of the raw data sets 202 and 204 to generate only one of the enriched data sets 210 and 212. In this case, the other enriched data set 210 or 212 could represent an unmodified version of one of the raw data sets 202 and 204 since no features were inserted in that enriched data set. As another example, the data enricher 208 may not add any features to either data set. In that case, the enriched data sets 210 and 212 could represent unmodified versions of the raw data sets 202 and 204.

The enriched data sets 210 and 212 are provided to a rule discovery process 214 and a match process 216. The rule discovery process 214 generally implements a discovery process that automatically identifies a sequence of matching rules to be used to determine when data discrepancies exist in the data sets 202 and 204. In other words, the rule discovery process 214 identifies data in the enriched data sets 210 and 212 that might be related and generates matching rules that will be used to compare that data. The rule discovery process 214 then outputs the matching rules to the match process 216, which uses the matching rules to actually compare the data in the enriched data sets 210 and 212.

In some embodiments, the rule discovery process 214 identifies the matching rules using the enriched data sets 210 and 212 and at least one rule discovery specification 218. The rule discovery specification 218 denotes one or more files, such as a machine readable document, that specify the parameters, constraints, computed columns, and other parameters driving rule discovery. The parameters in the rule discovery specification 218 can be provided by one or more users, such as administrators or other personnel, in order to control how the discovery process 214 generates the matching rules. For example, the rule discovery specification 218 could control how the rule discovery process 214 compares the data in the enriched data sets 210 and 212 in order to generate the matching rules.

Also, in some embodiments, the rule discovery process 214 outputs the matching rules that are generated as part of a reconciliation specification 220. The reconciliation specification 220 denotes one or more files, such as a machine readable document, that specify a sequence or pipeline of reconciliation rules, features to be added to the raw data sets, and other reconciliation parameters. The reconciliation specification 220 is used by the match process 216 to compare the data in the enriched data sets 210 and 212, and the reconciliation specification 220 could be used by the data enricher 208 to generate the additional engineered features. The processing could therefore be repeatable, such as when the data enricher 208 generates enriched data sets and the rule discovery process 214 generates a reconciliation specification 220 that updates how the data enricher 208 operates, at which point the data enricher 208 could enrich the data again. This loop could occur any number of times as needed or desired.

In addition, in this example, the rule discovery process 214 can provide one or more test rules to the match process 216 and receive test rule results from the match process 216. This may allow, for instance, the rule discovery process 214 to generate a test rule and see how well the match process 216 is able to match data in the enriched data sets 210 and 212 using the test rule. This could also be a repeatable process, such as when the rule discovery process 214 provides one or more test rules to the match process 216, obtains the results from the match process 216, and generates new or revised test rules that are provided to the match process 216 based on the results. This loop could occur any number of times as needed or desired. This testing allows the rule discovery process 214 to identify more effective matching rules for use in comparing the data sets.

The rule discovery process 214 includes any suitable logic for generating one or more matching rules to be used to compare data in different data sets. In some embodiments, the rule discovery process 214 could be implemented as a service. Of course, the rule discovery process 214 could be implemented in any other suitable manner.

The match process 216 generally implements a matching process that determines when data discrepancies exist in the data sets 202 and 204. For example, the match process 216 can compare related data in the enriched data sets 210 and 212 based on the matching rules that were generated by the rule discovery process 214. The match process 216 can perform the comparison to identify when data values in the enriched data sets 210 and 212 are inconsistent or when data values in one enriched data set 210 or 212 is missing in the other enriched data set 210 or 212.

In some embodiments, the match process 216 can perform pipeline matching according to the reconciliation specification 220 in order to identify the data discrepancies. In pipeline matching, the matching rules are selected in sequence, and the data in the enriched data sets 210 and 212 that match according to the current matching rule are removed from the enriched data sets 210 and 212 before the next matching rule is selected. This process can continue until the last matching rule in the sequence is selected and used. Ideally, this allows less and less data in the enriched data sets 210 and 212 to be compared as the matching rules are used in the sequence. Of course, the matching rules could be used in any other suitable manner.

In this example, the match process 216 could generate outputs that include matches 222 and breaks 224. For a given reconciliation run with two data sets, the matches 222 could identify the set of records or other data from both data sets that match based on the matching rules. The breaks 224 could identify the set of records or other data from either data set that failed to form a match based on any of the matching rules. The matches 222 and breaks 224 could be used in any suitable manner, such when the breaks 224 are provided to the exception system 106 for handling. Note that while shown as separate elements here, the matches 222 and breaks 224 could be identified in a common document or other data structure. Also, the match process 216 could output only matches 222 or only breaks 224 if needed or desired in a specific application.

The match process 216 includes any suitable logic for comparing data in different data sets and identifying consistencies or inconsistencies in the data. In some embodiments, the match process 216 could be implemented as a service. Of course, the match process 216 could be implemented in any other suitable manner.

In general, the reconciliation system 104 may use three types of matching characteristics to find and process matching data on the two sides (the data set 202 and the data set 204). The first type of characteristic is a "key," which represents a characteristic on each side that needs to be matched exactly in order to match data items on both sides. The second type of characteristic is a "value," which represents a characteristic on each side that needs to be matched in the aggregate (possibly up to some tolerance if numerical)

between groups of data items on each side. The third type of characteristic is a "permutation key," which represents a characteristic that is only used to group data items on at least one side and is not required to agree between the two sides in order for a match to be found. Rather, the resulting group or groups created by the permutation key on one or both sides are processed as matches or non-matches based on their keys and/or their values.

With permutation keys, groups of data with agreeing aggregate values are defined by the permutation keys and may not be arbitrary groups of data items. This constrained approach allows for the automated determination of the reconciliation or matching rules by the rule discovery process 214 since allowing completely arbitrary groups of data items may likely lead to false matches due to accidental agreement of values across unconstrained subgroups.

The reconciliation performed by the reconciliation system 104 is implemented by the application of matching rules determined by the rule discovery process 214 and applied by the match process 216. Each matching rule involves zero or more keys, zero or more values, and/or zero or more permutation keys (although there is at least one key, value, or permutation key per rule). Data items can be grouped on the two sides by the matching process 216 according to the keys and permutation keys, and a group on one side and a group on the other side are processed as matches if there is agreement between the two groups in their keys and aggregate values (ignoring the permutation keys). After the application of each rule, the matched items are separated or removed from the data sets by the matching process 216, and the next rule is applied to the remaining data items in the data sets. After all the rules have been applied, the remaining data items in the data sets are labelled by the system as the breaks 224 and may be sent to another system that handles exceptions or used in any suitable manner. If desired, the removed data items from the data sets can be labelled by the system as the matches 222 and may be sent to another system for use in any suitable manner.

FIGS. 3A and 3B illustrate an example result of reconciling data using permutation matching according to this disclosure. In particular, FIGS. 3A and 3B illustrate an example result obtained by the reconciliation system 104 of FIG. 2 when processing data that is shown in two tables 302 and 304.

As shown in FIGS. 3A and 3B, a permutation key is used to reconcile scientific data sets generated during the collection of ant species. The data set in the table 302 could be taken from individual collectors' notebooks, where each entry records a collection bag, a number of ants of a specific species, and a time that the bag was delivered to a central collection point. The data set in the table 304 denotes the data recorded at the central data collection point, showing the number of ants of each species delivered in a particular batch of collection bags. Here, the data models are different in the two data sets, namely the table 302 divides the data by collection bags and the table 304 divides the data by groups of collection bags.

If the reconciliation system 104 uses only the species field on each side as a key and the quantity field on each side as a value, every single row in both tables 302 and 304 would be processed as a "break" (a non-match). This is because there are no groups of rows identified by keys and values in the table 302 that have matching groups in the table 304.

Since the reconciliation system 104 is able to use permutation keys, the rule discovery process 214 could determine that the time field in the table 302 and the ID field in the table 304 correspond so that groups of entries in the table 302 correspond to single entries in the table 304. With this understanding, the match process 216 could determine that there are only three rows of data in the two tables 302 and 304 to be processed as breaks. Using the time field in the table 302 as a permutation key helps the reconciliation system 104 to aggregate the data into groups that correspond to something meaningful in the table 304, even though the times themselves from the table 302 do not appear explicitly in the table 304.

Returning to FIG. 2, the rule discovery process 214 operates to discover and optimize the best sequence of rules automatically, based on the data contained in the enriched data sets 210 and 212. In order to accomplish this, the rule discovery process 214 identifies how to judge which sequence of rules is the best. One possible metric here is the quantity or number of data items processed as matches. While effective, this does not account for the fact that higher quality matches of finer granularity may provide more confidence in the matching result. Therefore, another or alternative metric could be a combination of quantity (number of matching data items) and quality (number of matching data item groups), such as a geometric average of the two. To optimize the sequence of rules, the quality and quantity metrics could be soft metrics, such as by having the reconciliation system 104 count as partial matches those where the aggregate values are relatively close but not equal. Various other matching metrics for the reconciliation system 104 to use in implementing in its optimization process could be envisioned by one of ordinary skill in the art.

To implement the optimization of the rules to be used in the reconciliation system 104, one possible technique is simulated annealing. In this technique, the reconciliation system 104 proceeds in steps or iterations, across which a quantity stored in the reconciliation system 104 called a "temperature" steadily decreases. In each step or iteration, the reconciliation system 104 proposes to add or remove a random choice of a key or a permutation key, and the rule discovery process 214 sends one or more test rules to implement this to the match process 216 and receives the results. If the matching metric improves, the reconciliation system 104 keeps the suggestion. If the metric deteriorates, the reconciliation system 104 keeps the suggestion with a probability that decreases as the deterioration increases and the temperature decreases. This dynamic allows the reconciliation system 104 to explore the rule space early in the optimization process when the temperature is high and enforces exploitation of good rules later in the optimization process when the temperature is low.

For the reconciliation system 104 to implement an efficient optimization, at each step or iteration of the simulated annealing, the reconciliation system 104 can constrain the random choice of the key or the permutation key to only include pairs that are likely to improve the matching. Keys on the two sides could be constrained to those that have high similarity in frequency distributions. Conversely, permutation keys could be constrained to those whose frequency distributions have low similarity to any characteristic on the other side.

Each of the components 206, 208, 214, 216 of the reconciliation system 104 could be implemented in any suitable manner. For example, each of the components 206, 208, 214, 216 could be implemented using software executed by one or more processors. The components 206, 208, 214, 216 could be implemented within the same device, within multiple devices that are local to one another, or within remote devices. Also, each of the informational components 202, 204, 210, 212, 218, 220, 222, 224 could represent any suitable information having any suitable format.

Although FIG. 2 illustrates one example of a reconciliation system 104 for reconciling data using permutation matching, various changes may be made to FIG. 2. For example, components could be added, omitted, combined, further subdivided, or placed in any other suitable configuration according to particular needs. Also, while the rule discovery process 214 and the match process 216 are shown as processing the enriched data sets 210 and 212, the rule discovery process 214 and the match process 216 could process the raw data sets 202 or 204 or a mixture of raw and enriched data sets as noted above. Although FIGS. 3A and 3B illustrate one example of a result of reconciling data using permutation matching, various changes may be made to FIGS. 3A and 3B. For instance, the data shown here is meant to illustrate how the reconciliation system 104 may operate, and any other suitable data could be processed by the reconciliation system 104.

Figure 4:
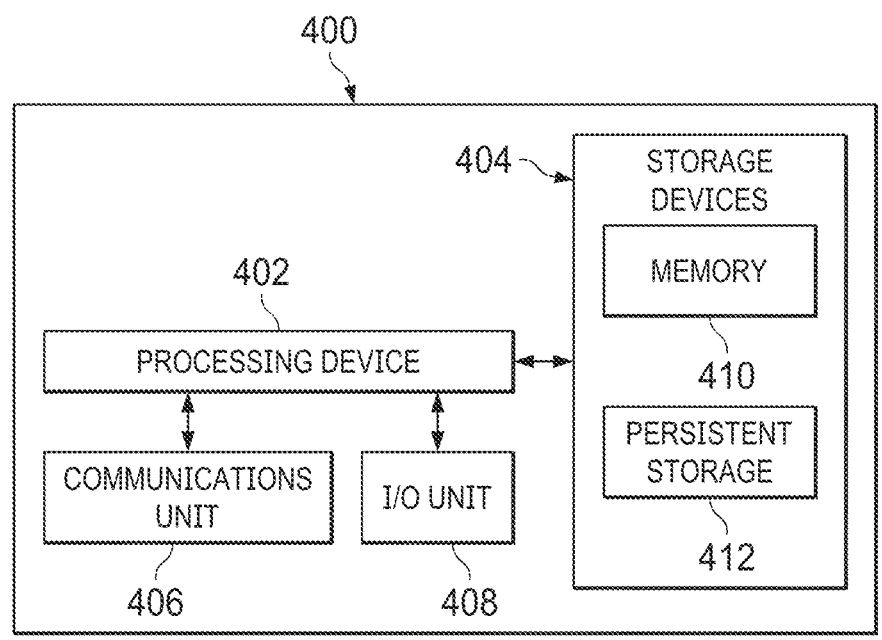
FIG. 4 illustrates an example device supporting reconciliation of data using permutation matching according to this disclosure.

FIG. 4 illustrates an example device 400 supporting reconciliation of data using permutation matching according to this disclosure. The device 400 could, for example, implement part or all of the reconciliation system 104 described above.

As shown in FIG. 4, the device 400 includes at least one processor 402, at least one storage device 404, at least one communications unit 406, and at least one input/output (I/O) unit 408. Each processor 402 can execute instructions, such as those that may be loaded into a memory 410. The instructions could implement part or all of the reconciliation technique described in this patent document. Each processor 402 denotes any suitable processing device, such as one or more microprocessors, microcontrollers, digital signal processors, application specific integrated circuits (ASICs), field programmable gate arrays (FPGAs), or discrete circuitry.

The memory 410 and a persistent storage 412 are examples of storage devices 404, which represent any structure(s) capable of storing and facilitating retrieval of information (such as data, program code, and/or other suitable information on a temporary or permanent basis). The memory 410 may represent a random access memory or any other suitable volatile or non-volatile storage device(s). The persistent storage 412 may contain one or more components or devices supporting longer-term storage of data, such as a read only memory, hard drive, Flash memory, or optical disc.

The communications unit 406 supports communications with other systems or devices. For example, the communications unit 406 could include a network interface card or a wireless transceiver facilitating communications over a wired or wireless network. The communications unit 406 may support communications through any suitable physical or wireless communication link(s).

The I/O unit 408 allows for input and output of data. For example, the I/O unit 408 may provide a connection for user input through a keyboard, mouse, keypad, touchscreen, or other suitable input device. The I/O unit 408 may also send output to a display, printer, or other suitable output device.

Although FIG. 4 illustrates one example of a device 400 supporting reconciliation of data using permutation matching, various changes may be made to FIG. 4. For example, components could be added, omitted, combined, further subdivided, or placed in any other suitable configuration according to particular needs. Also, computing devices can come in a wide variety of configurations, and FIG. 4 does not limit this disclosure to any particular configuration of computing device.

Figure 5:
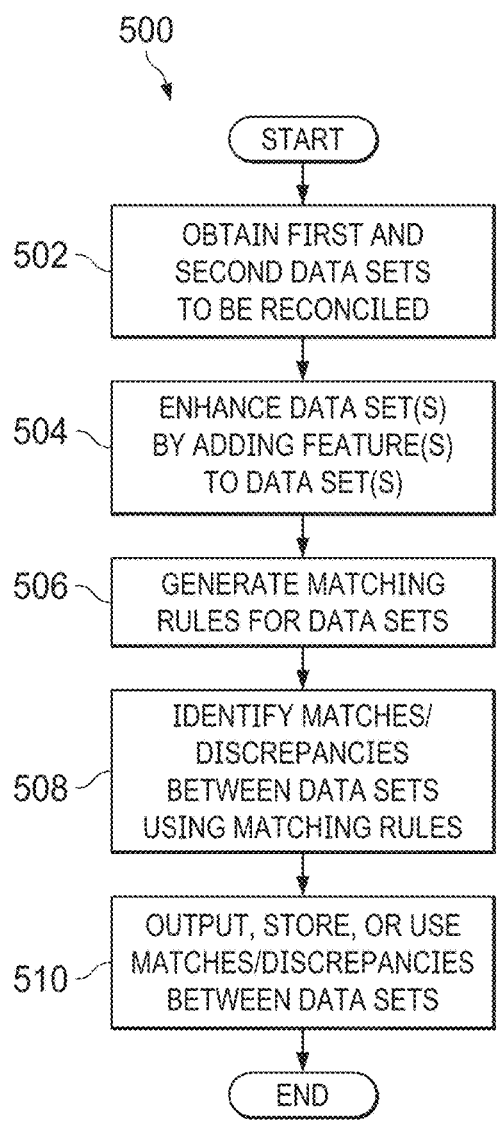
FIG. 5 illustrates an example method for reconciliation of data in multiple systems using permutation matching according to this disclosure.

FIG. 5 illustrates an example method 500 for reconciliation of data in multiple systems using permutation matching according to this disclosure. For ease of explanation, the method 500 of FIG. 5 is described as being implemented in the system 100 of FIG. 1 using the device 400 of FIG. 4 that supports the reconciliation system 104 of FIG. 2. However, the method 500 could be used with any other suitable device or system to reconcile any suitable data.

As shown in FIG. 5, at least first and second data sets to be reconciled are obtained at step 502. This could include, for example, the processor 402 executing the process coordinator 206 to obtain raw data sets 202 and 204 from one or more sources. The raw data sets 202 and 204 could each have any suitable form, such as tabular data. One or more of the data sets can optionally be enhanced by adding at least one feature to the one or more data sets at step 504. This could include, for example, the processor 402 executing the process coordinator 206 to provide the raw data sets 202 and 204 to the data enricher 208. This could also include the processor 402 executing the data enricher 208 to add any suitable feature values to the raw data sets 202 and 204. As noted above, however, one or both of the enriched data sets 210 and 212 could denote unmodified versions of one or both of the raw data sets 202 and 204. This could further include the processor 402 executing the process coordinator 206 to receive the enriched data sets 210 and 212 from the data enricher 208.

Matching rules for the data sets are generated at step 506. This could include, for example, the processor 402 executing the rule discovery process 214 to generate a sequence of matching rules. The rule discovery process 214 could use at least one rule discovery specification 218 to process the enriched data sets 210 and 212 and generate the sequence of matching rules in a reconciliation specification 220. The matching rules include at least one permutation key, where each permutation key identifies a subset of data to be grouped together in one of the data sets. Depending on the data sets being reconciled, there could be multiple permutation keys, where at least two of the permutation keys are associated with different subsets of data in different ones of the data sets.

Matches or discrepancies between the data sets are identified using the matching rules at step 508. This could include, for example, the processor 402 executing the match process 216 to identify consistent or inconsistent data in the enriched data sets 210 and 212 based on the matching rules. This could also include the processor 402 executing the match process 216 to attempt to match one or more characteristics associated with a grouped subset of data in one of the data sets (as defined by a permutation key) to one or more characteristics associated with data (grouped or ungrouped) in another of the data sets. The characteristics could include a key that needs to match exactly between data items in the data sets in order to match the data items in the data sets. The characteristics could also include a value that needs to match in aggregate between groups of data items in the data sets in order to match the groups of data items in the data sets. The characteristics could further include a value that needs to match in aggregate within a tolerance between groups of data items in the data sets in order to match the groups of data items in the data sets.

The identified matches or discrepancies are output, stored, or used in some manner at step 510. This could include, for example, the processor 402 executing the match process 216 to output matches 222 or breaks 224 to the computing systems 102a-102b, the exception system 106, or the additional computing system 108. The results can be used to perform any suitable functions, such as data validation, data migration verification, and defect or fault detection. As noted above, however, there are various ways in which data reconciliation results can be used.

Although FIG. 5 illustrates one example of a method 500 for reconciliation of data in multiple systems using permutation matching, various changes may be made to FIG. 5. For example, while shown as a series of steps, various steps in FIG. 5 could overlap, occur in parallel, or occur any number of times. Also, the various operations shown in FIG. 5 could be performed using a single device or a combination of devices as needed or desired.

Figure 6:
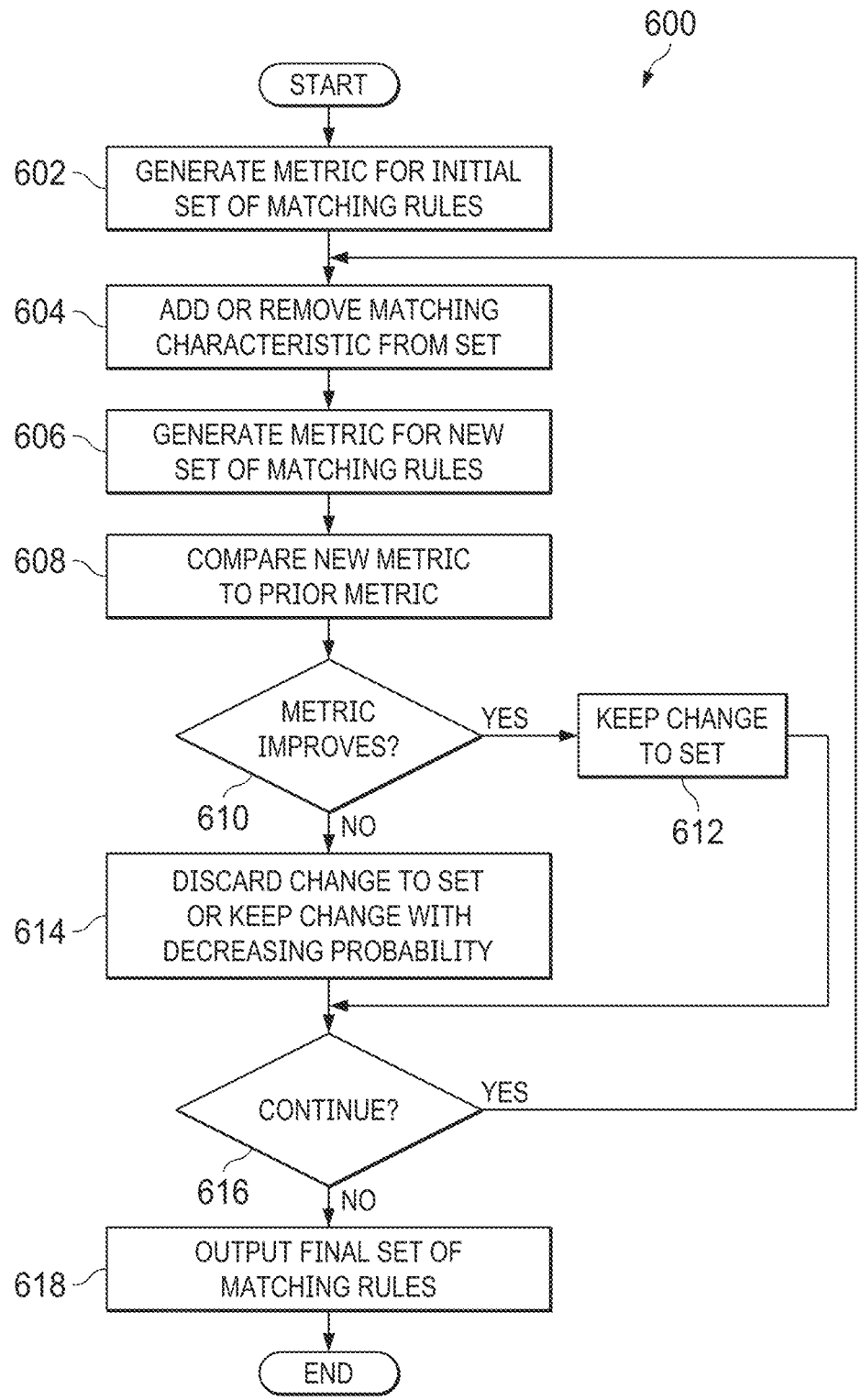
FIG. 6 illustrates an example method for generating matching rules used to reconcile data according to this disclosure.

FIG. 6 illustrates an example method 600 for generating matching rules used to reconcile data according to this disclosure. The method 600 could, for example, be used during step 506 in the method 500 of FIG. 5. For ease of explanation, the method 600 of FIG. 6 is described as being implemented in the system 100 of FIG. 1 using the device 400 of FIG. 4 that supports the reconciliation system 104 of FIG. 2. However, the method 600 could be used with any other suitable device or system to reconcile any suitable data.

As shown in FIG. 6, a metric is generated for an initial set of matching rules at step 602. This could include, for example, the processor 402 executing the rule discovery process 214 to generate an initial set of matching rules that includes a single matching characteristic or multiple matching characteristics. Each matching characteristic could represent a possible key or permutation key, and the matching characteristic(s) in the initial set could be selected in any suitable manner. This could also include the processor 402 executing the rule discovery process 214 to send the initial set of matching rules to the match process 216 as one or more test rules. This could further include the processor 402 executing the match process 216 to identify the matching results achieved using the one or more test rules. In addition, this could include the processor 402 executing the rule discovery process 214 to generate a metric based on the quantity of the matches obtained using the test rule(s) or based on a combination of a quantity and a quality of the matches obtained using the test rule(s).

A matching characteristic is added to or removed from the set of matching rules at step 604. This could include, for example, the processor 402 executing the rule discovery process 214 to randomly add or randomly remove a key or permutation key to or from the set of matching rules. As noted above, the random addition or removal can be constrained to only include keys or permutation keys that are likely to improve the matching. As particular examples, the addition or removal could be constrained to keys with similar frequency distributions in the data sets and permutation keys with dissimilar frequency distributions in the data sets.

A metric is generated for the new set of matching rules at step 606. This could occur in the same or similar manner as in step 602. The prior metric for the preceding set of matching rules is compared to the current metric for the new set of matching rules at step 608, and a determination is made whether the metric improved at step 610. This could include, for example, the processor 402 executing the rule discovery process 214 to compare the metrics and determine if the current metric offers better matching performance. If so, the change to the set is retained at step 612. This could include, for example, the processor 402 executing the rule discovery process 214 to keep the added matching characteristic in the set or to keep the removed matching characteristic out of the set. Otherwise, the change to the set can be discarded or kept with a decreasing probability of step 614. This could include, for example, the processor 402 executing the rule discovery process 214 to remove the added matching characteristic from the set or to add the removed matching characteristic back into the set. This could also include the processor 402 executing the rule discovery process 214 to keep the added matching characteristic in the set or to keep the removed matching characteristic out of the set, but with a probability that decreases over time (allowing the change to possibly be undone at a later point in time).

A determination is made whether to continue at step 616. This could include, for example, the processor 402 executing the rule discovery process 214 to determine whether there are additional keys or permutation keys that could be added to or removed from the set of matching rules. If so, the process returns to step 604 to add or remove another matching characteristic. Otherwise, a final set of matching rules can be output at step 618. This could include, for example, the processor 402 executing the rule discovery process 214 to generate the reconciliation specification 220. The output rules could define rules that are based on the matching characteristics retained in the set of matching rules. The output rules could also define a sequence of rules to be applied in order, although any other types of matching rules could be generated and output here.

Although FIG. 6 illustrates one example of a method 600 for generating matching rules used to reconcile data, various changes may be made to FIG. 6. For example, while shown as a series of steps, various steps in FIG. 6 could overlap, occur in parallel, or occur any number of times. Also, the various operations shown in FIG. 6 could be performed using a single device or a combination of devices as needed or desired. In addition, the method 600 represents one example way in which matching rules could be generated, although any other suitable techniques could be used to generate the matching rules (at least one of which includes a permutation key).

Figure 7:
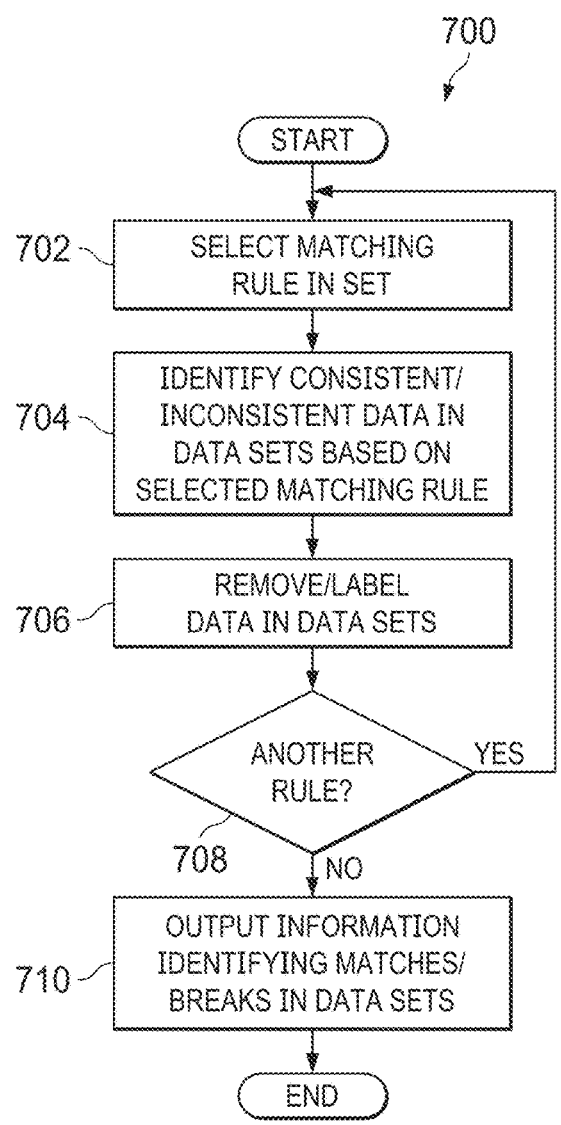
FIG. 7 illustrates an example method for using matching rules to reconcile data according to this disclosure.

FIG. 7 illustrates an example method 700 for using matching rules to reconcile data according to this disclosure. The method 700 could, for example, be used during step 508 in the method 500 of FIG. 5. For ease of explanation, the method 700 of FIG. 7 is described as being implemented in the system 100 of FIG. 1 using the device 400 of FIG. 4 that supports the reconciliation system 104 of FIG. 2. However, the method 700 could be used with any other suitable device or system to reconcile any suitable data.

As shown in FIG. 7, a matching rule in a set is selected at step 702. This could include, for example, the processor 402 executing the match process 216 to select the first rule in a sequence of rules defined in the reconciliation specification 220. Consistent or inconsistent data in two data sets is identified based on the selected matching rule at step 704. This could include, for example, the processor 402 executing the match process 216 to identify data in the data sets having matching keys or values or non-matching keys or values (possibly with some tolerance). This could also include the processor 402 executing the match process 216 to group data in a manner defined by one or more permutation keys and determining whether the grouped data matches or fails to match other data based on their keys or values (possibly with some tolerance). The other data could itself be grouped according to one or more permutation keys, although this is not required.

Data can be labeled or removed from the data sets based on the results of the analysis at step 706. This could include, for example, the processor 402 executing the match process 216 to remove matching data from the data sets so that only unmatched data remains in the data sets. This could also include the processor 402 executing the match process 216 to label consistent data or inconsistent data in the data sets. In general, any suitable mechanism can be used to identify the data that is or is not consistent in the data sets based on the use of the matching rule.

A determination is made whether there is another rule to be used at step 708. This could include, for example, the processor 402 executing the match process 216 to determine whether there is another rule in the sequence defined in the reconciliation specification 220. This could also include the processor 402 executing the match process 216 to determine whether all data in the data sets has already been identified as matching, in which case there is no need for using further rules even if they are defined in the reconciliation specification 220.

If another rule needs to be used, the process returns to step 702 to select the next matching rule. Otherwise, information identifying the matches and/or breaks in the data sets is output at step 710. This could include, for example, the processor 402 executing the match process 216 to identify the breaks 224 as any data remaining in the data sets that was not removed or any data labeled as inconsistent in the data sets. This could also include the processor 402 executing the match process 216 to identify the matches 222 as any data removed from the data sets or any data labeled as consistent in the data sets.

Although FIG. 7 illustrates one example of a method 700 for using matching rules to reconcile data, various changes may be made to FIG. 7. For example, while shown as a series of steps, various steps in FIG. 7 could overlap, occur in parallel, or occur any number of times. Also, the various operations shown in FIG. 7 could be performed using a single device or a combination of devices as needed or desired. In addition, the method 700 represents one example way in which matching rules could be used to reconcile data, although any other suitable techniques could be used to reconcile data using matching rules (at least one of which includes a permutation key).

In some embodiments, various functions described in this patent document are implemented or supported by a computer program that is formed from computer readable program code and that is embodied in a computer readable medium. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

It may be advantageous to set forth definitions of certain words and phrases used throughout this patent document. The terms "application" and "program" refer to one or more computer programs, software components, sets of instructions, procedures, functions, objects, classes, instances, related data, or a portion thereof adapted for implementation in a suitable computer code (including source code, object code, or executable code). The term "communicate," as well as derivatives thereof, encompasses both direct and indirect communication. The terms "include" and "comprise," as well as derivatives thereof, mean inclusion without limitation. The term "or" is inclusive, meaning and/or. The phrase "associated with," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, have a relationship to or with, or the like. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

The description in this patent document should not be read as implying that any particular element, step, or function is an essential or critical element that must be included in the claim scope. Also, none of the claims is intended to invoke 35 U.S.C. § 112(f) with respect to any of the appended claims or claim elements unless the exact words "means for" or "step for" are explicitly used in the particular claim, followed by a participle phrase identifying a function. Use of terms such as (but not limited to) "mechanism," "module," "device," "unit," "component," "element," "member," "apparatus," "machine," "system," "processor," "processing device," or "controller" within a claim is understood and intended to refer to structures known to those skilled in the relevant art, as further modified or enhanced by the features of the claims themselves, and is not intended to invoke 35 U.S.C. § 112(f).

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. A method comprising:
   obtaining, by at least one processing device, a first data set generated by a first computing system and a second data set generated by a second computing system, the first and second data sets configured to be reconciled;
   enriching, by the at least one processing device, at least one of the first and second data sets by adding feature values to the at least one data set, the feature values selected to account for a difference in format between the first and second data sets;
   generating, by the at least one processing device, matching rules based on the first and second data sets;
   using the matching rules, identifying, by the at least one processing device, discrepancies between the first and second data sets; and
   outputting, by the at least one processing device, the discrepancies between the first and second data sets to at least one of the first computing system, the second computing system, or a third computing system,
   wherein the matching rules include at least one permutation key, each permutation key identifying a subset of data to be grouped together in one of the first and second data sets;

wherein identifying the discrepancies comprises attempting to match one or more first characteristics associated with the grouped subset of data in one of the first and second data sets to one or more second characteristics associated with another of the first and second data sets;

wherein generating the matching rules comprises (i) randomly adding or removing possible permutation keys in multiple simulation iterations, (ii) determining a metric for each simulation iteration, and (iii) selecting the at least one permutation key from the possible permutation keys based on the metrics of the simulation iterations; and wherein randomly adding or removing the possible permutation keys is constrained to permutation keys with dissimilar frequency distributions in the first and second data sets.

2. The method of claim 1, wherein the first and second characteristics comprise a key that needs to match exactly between data items in the first and second data sets in order to match the data items in the first and second data sets.

3. The method of claim 1, wherein the first and second characteristics comprise a value that needs to match in aggregate between groups of data items in the first and second data sets in order to match the groups of data items in the first and second data sets.

4. The method of claim 1, wherein the first and second characteristics comprise a value that needs to match in aggregate within a tolerance between groups of data items in the first and second data sets in order to match the groups of data items in the first and second data sets.

5. The method of claim 1, wherein the metric for each simulation iteration is based on a combination of a number of matched data items and a number of matched groups of data items.

6. The method of claim 1, wherein the matching rules include multiple permutation keys, different permutation keys associated with different subsets of data in different ones of the first and second data sets.

7. An apparatus comprising:
at least one memory configured to store a first data set generated by a first computing system and a second data set generated by a second computing system, the first and second data sets configured to be reconciled; and
at least one processing device configured to:
enrich at least one of the first and second data sets by adding feature values to the at least one data set, the feature values selected to account for a difference in format between the first and second data sets;
generate matching rules based on the first and second data sets;
identify discrepancies between the first and second data sets using the matching rules; and
control the apparatus to output the discrepancies between the first and second data sets to at least one of the first computing system, the second computing system, or a third computing system,
wherein the matching rules include at least one permutation key, each permutation key identifying a subset of data to be grouped together in one of the first and second data sets;
wherein, to identify the discrepancies, the at least one processing device is configured to attempt to match one or more first characteristics associated with the grouped subset of data in one of the first and second data sets to one or more second characteristics associated with another of the first and second data sets;

wherein, to generate the matching rules, the at least one processing device is configured to (i) randomly add or remove possible permutation keys in multiple simulation iterations, (ii) determine a metric for each simulation iteration, and (iii) select the at least one permutation key from the possible permutation keys based on the metrics of the simulation iterations; and wherein, to randomly add or remove the possible permutation keys, the at least one processing device is constrained to permutation keys with dissimilar frequency distributions in the first and second data sets.

8. The apparatus of claim 7, wherein the first and second characteristics comprise a key that needs to match exactly between data items in the first and second data sets in order to match the data items in the first and second data sets.

9. The apparatus of claim 7, wherein the first and second characteristics comprise a value that needs to match in aggregate between groups of data items in the first and second data sets in order to match the groups of data items in the first and second data sets.

10. The apparatus of claim 7, wherein the first and second characteristics comprise a value that needs to match in aggregate within a tolerance between groups of data items in the first and second data sets in order to match the groups of data items in the first and second data sets.

11. The apparatus of claim 7, wherein the metric for each simulation iteration is based on a combination of a number of matched data items and a number of matched groups of data items.

12. The apparatus of claim 7, wherein the matching rules include multiple permutation keys, different permutation keys associated with different subsets of data in different ones of the first and second data sets.

13. A non-transitory computer readable medium containing instructions that when executed cause at least one processor to:
obtain a first data set generated by a first computing system and a second data set generated by a second computing system, the first and second data sets configured to be reconciled;
enrich at least one of the first and second data sets by adding feature values to the at least one data set, the feature values selected to account for a difference in format between the first and second data sets;
generate matching rules based on the first and second data sets;
using the matching rules, identify discrepancies between the first and second data sets; and
output the discrepancies between the first and second data sets to at least one of the first computing system, the second computing system, or a third computing system,
wherein the matching rules include at least one permutation key, each permutation key identifying a subset of data to be grouped together in one of the first and second data sets;
wherein the instructions that when executed cause the at least one processor to identify the discrepancies comprise:
instructions that when executed cause the at least one processor to attempt to match one or more first characteristics associated with the grouped subset of data in one of the first and second data sets to one or more second characteristics associated with another of the first and second data sets;
wherein the instructions that when executed cause the at least one processor to generate the matching rules comprise:

instructions that when executed cause the at least one processor to (i) randomly add or remove possible permutation keys in multiple simulation iterations, (ii) determine a metric for each simulation iteration, and (iii) select the at least one permutation key from the possible permutation keys based on the metrics of the simulation iterations; and wherein the randomly added or removed possible permutation keys are constrained to permutation keys with dissimilar frequency distributions in the first and second data sets.

14. The non-transitory computer readable medium of claim 13, wherein the first and second characteristics comprise a key that needs to match exactly between data items in the first and second data sets in order to match the data items in the first and second data sets.

15. The non-transitory computer readable medium of claim 13, wherein the first and second characteristics comprise a value that needs to match in aggregate between groups of data items in the first and second data sets in order to match the groups of data items in the first and second data sets.

16. The non-transitory computer readable medium of claim 13, wherein the first and second characteristics comprise a value that needs to match in aggregate within a tolerance between groups of data items in the first and second data sets in order to match the groups of data items in the first and second data sets.

17. The non-transitory computer readable medium of claim 13, wherein the metric for each simulation iteration is based on a combination of a number of matched data items and a number of matched groups of data items.

18. The non-transitory computer readable medium of claim 13, wherein the matching rules include multiple permutation keys, different permutation keys associated with different subsets of data in different ones of the first and second data sets.

\* \* \* \* \*

UNITED STATES PATENT AND TRADEMARK OFFICE
CERTIFICATE OF CORRECTION

| | | |
|---|---|---|
| PATENT NO. | : 11,086,906 B2 | Page 1 of 1 |
| APPLICATION NO. | : 15/938084 | |
| DATED | : August 10, 2021 | |
| INVENTOR(S) | : Burchard et al. | |

It is certified that error appears in the above-identified patent and that said Letters Patent is hereby corrected as shown below:

On the Title Page

Item (72), in Column 1 under "Inventors:", Line 3, after "NY (US)", insert --Sahir Pathan, Princeton Junction, NY (US); Kunal Baxi, Jersey City, NJ (US); Brandon Oren Amir, Longport, NJ (US)--, therefor.

Signed and Sealed this
Sixteenth Day of April, 2024

Katherine Kelly Vidal
*Director of the United States Patent and Trademark Office*